(12) United States Patent
Meng et al.

(10) Patent No.: US 12,354,243 B2
(45) Date of Patent: *Jul. 8, 2025

(54) IMAGE DENOISING METHOD, DEVICE, AND COMPUTER-READABLE MEDIUM USING U-NET

(71) Applicant: GUANGDONG OPPO MOBILE TELECOMMUNICATIONS CORP., LTD., Guangdong (CN)

(72) Inventors: Zibo Meng, Palo Alto, CA (US); Chiuman Ho, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 416 days.

This patent is subject to a terminal disclaimer.

(21) Appl. No.: 17/810,268

(22) Filed: Jun. 30, 2022

(65) Prior Publication Data
US 2022/0343468 A1 Oct. 27, 2022

Related U.S. Application Data

(63) Continuation of application No. PCT/CN2020/127126, filed on Nov. 6, 2020.
(Continued)

(51) Int. Cl.
*G06T 5/70* (2024.01)
*G06T 3/4015* (2024.01)
(Continued)

(52) U.S. Cl.
CPC ............. *G06T 5/70* (2024.01); *G06T 3/4015* (2013.01); *G06T 3/4046* (2013.01); *G06T 5/20* (2013.01); *G06T 2207/20081* (2013.01)

(58) Field of Classification Search
None
See application file for complete search history.

(56) References Cited

U.S. PATENT DOCUMENTS

| 8,872,856 | B1 | 10/2014 | Masterson |
| 11,398,016 | B2 * | 7/2022 | Meng ................... G06V 10/451 |

(Continued)

FOREIGN PATENT DOCUMENTS

| CN | 107016665 | 8/2017 |
| CN | 108010031 | 5/2018 |

(Continued)

OTHER PUBLICATIONS

Couturier et al., "Image Denoising Using a Deep Encoder-Decoder Network with Skip Connections," L. Cheng et al. (Eds.): ICONIP 2018, LNCS 11306, pp. 554-565, 2018. (Year: 2018).*

(Continued)

*Primary Examiner* — Soo Shin
(74) *Attorney, Agent, or Firm* — Hodgson Russ LLP

(57) ABSTRACT

An image processing method, an electronic device, and a computer-readable storage medium are provided. In the method, a first image is processed through a U-net to obtain a second image, and the second image is a noise map of the first image. The U-net includes an encoding network, a decoding network, and a bottleneck network between the encoding network and the decoding network. The bottleneck network includes a global pooling layer, a bilinear upscaling layer, and a 1×1 convolutional layer. Moreover, a third image is generated according to the first image and the second image, and the third image is a denoised map of the first image.

20 Claims, 5 Drawing Sheets

Related U.S. Application Data

(60) Provisional application No. 62/959,791, filed on Jan. 10, 2020.

(51) Int. Cl.
    *G06T 3/4046*     (2024.01)
    *G06T 5/20*     (2006.01)

(56) References Cited

U.S. PATENT DOCUMENTS

| | | | |
|---|---|---|---|
| 11,468,543 | B1 | 10/2022 | Wang et al. |
| 11,741,578 | B2* | 8/2023 | Meng .................. G06T 5/60 |
| | | | 382/274 |
| 11,887,280 | B2* | 1/2024 | Meng .................. G06V 10/82 |
| 2016/0239706 | A1 | 8/2016 | Dijkman et al. |
| 2017/0278546 | A1 | 9/2017 | Xiao et al. |
| 2018/0114294 | A1 | 4/2018 | Yang et al. |
| 2018/0293429 | A1 | 10/2018 | Wechsler et al. |
| 2019/0130562 | A1* | 5/2019 | Liu .................. G06T 7/0012 |
| 2019/0332900 | A1* | 10/2019 | Sjolund .................. G06T 9/002 |
| 2020/0034948 | A1 | 1/2020 | Park et al. |
| 2020/0065969 | A1 | 2/2020 | Huang et al. |
| 2020/0084427 | A1 | 3/2020 | Sun et al. |
| 2021/0256667 | A1 | 8/2021 | Meng et al. |
| 2021/0279509 | A1 | 9/2021 | Meng et al. |
| 2022/0086410 | A1 | 3/2022 | Meng et al. |
| 2022/0207651 | A1 | 6/2022 | Meng et al. |
| 2022/0207870 | A1 | 6/2022 | Meng et al. |
| 2024/0395059 | A1* | 11/2024 | Li .................. G06V 20/695 |

FOREIGN PATENT DOCUMENTS

| | | |
|---|---|---|
| CN | 108038823 | 5/2018 |
| CN | 108038832 | 5/2018 |
| CN | 109190752 | 1/2019 |
| WO | 2016132145 | 8/2016 |

OTHER PUBLICATIONS

Guan et al., "NODE: Extreme Low Light Raw Image Denoising using a Noise Decomposition," arXiv:1909.05249v1 [eess.IV] Sep. 11, 2019 (Year: 2019).*
Rudin et al., "Nonlinear total variation based noise removal algorithms," Physica D: Nonlinear Phenomena, 1992, vol. 60.
Portilla et al., "Image denoising using scale mixtures of Gaussians in the wavelet domain," IEEE Transactions on Image Processing, 2003, vol. 12, No. 11.
Mairal et al., "Non-local sparse models for image restoration," IEEE 12th International Conference on Computer Vision (ICCV), 2009.
Gu et al., "Weighted nuclear norm minimization with application to image denoising," IEEE Conference on Computer Vision and Pattern Recognition, 2014.
Dabov et al., "Image denoising by sparse 3D transform-domain collaborative filtering," IEEE Transactions on Image Processing, 2007, vol. 16, No. 8.
Jain et al., "Natural image denoising with convolutional networks," Advances in Neural Information Processing Systems 21 (NIPS), 2008.
Zhang et al., "Beyond a Gaussian denoiser: Residual learning of deep CNN for image denoising," IEEE Transactions on Image Processing, 2017.
Hasinoff et al., "Burst photography for high dynamic range and low-light imaging on mobile cameras," ACM Transactions on Graphics, 2016, vol. 35, No. 6.
Liu et al., "Fast burst images denoising," ACM Transactions on Graphics, 2014, vol. 33, No. 6.
Dong et al., "Fast efficient algorithm for enhancement of low lighting video," IEEE International Conference on Multimedia and Expo, 2011.
Malm et al., "Adaptive enhancement and noise reduction in very low light-level video," IEEE 11th International Conference on Computer Vision, 2007.
Loza et al., "Automatic contrast enhancement of low-light images based on local statistics of wavelet coefficients,". Digital Signal Processing, 2013, vol. 23, No. 6.
Park et al., "Low-light image enhancement using variational optimization-based Retinex model," IEEE Transactions on Consumer Electronics, 2007, vol. 63, No. 2.
Guo et al., "LIME: Low-light image enhancement via illumination map estimation," IEEE Transactions on Image Processing, 2017, vol. 26, No. 2.
Chen et al., "Learning to See in the Dark," Conference on Computer Vision and Pattern Recognition, 2018.
Wang et al., "Multiscale structural similarity for image quality assessment," Proceedings of the 37th IEEE Asilomar Conference on Signals, Systems and Computers, 2003.
Mildenhall et al., "Burst denoising with kernel prediction networks". EEE/CVF Conference on Computer Vision and Pattern Recognition, 2018.
Ronneberger et al., "U-Net: Convolutional Networks for Biomedical Image Segmentation," Medical Image Computing and Computer-Assisted Intervention (MICCAI), 2015.
WIPO, International Search Report and Written Opinion for PCT/CN2020/127126, Jan. 29, 2021.
USPTO, Notice of Allowance for U.S. Appl. No. 17/697,866, filed Dec. 17, 2024.
Ibtehaz et al., "MultiResUNet: Rethinking the U-Net Architecture for Multimodal Biomedical Image Segmentation," arXiv:1902.04049v1, Feb. 11, 2019.
WIPO, International Search Report and Written Opinion for PCT/CN2020/109580, Nov. 20, 2020.
USPTO, Non-Final Rejection for U.S. Appl. No. 17/696,787, filed Jun. 14, 2024.
WIPO, International Search Report and Written Opinion for PCT/CN2020/109581, Nov. 26, 2020.
Rizwan et al., "Local enhancement for robust face detection in poor SNR images," IJCSNS International Journal of Computer Science and Network Security, Jun. 2009, vol. 9, No. 6.
Socolinsky et al., "Image intensification for low-light face recognition," Proceedings of the 2006 Conference on Computer Vision and Pattern Recognition Workshop (CVPRW06), 2006.
Ren et al., "A novel approach of low-light image used for face recognition," 4th International Conference on Computer Science and Network Technology (ICCSNT 2015), 2015.
Kang et al., "A novel approach of low-light image denoising for face recognition," Advances in Mechanical Engineering, 2014, vol. 2014, article No. 256790.
Cho et al., "Face Detection in Nighttime Images Using Visible-Light Camera Sensors with Two-Step Faster Region-Based Convolutional Neural Network," Sensors, 2018, vol. 18, No. 2995.
Tan et al., "PPEDNet: Pyramid Pooling Encoder-Decoder Network for Real-Time Semantic Segmentation," Image and Graphics (ICIG 2017), Lecture Notes in Computer Science, 2017, vol. 10666.
Li et al., "Bottleneck feature supervised U-Net for pixel-wise liver and tumor segmentation," Expert Systems With Applications, May 2020, vol. 145, No. 113131.
Cai et al., "MA-Unet: An improved version of Unet based on multi-scale and attention mechanism for medical image segmentation," Third International Conference on Electronics and Communication; Network and Computer Technology (ECNCT 2021), 2022, vol. 12167.
USPTO, Notice of Allowance for U.S. Appl. No. 17/696,787, filed Sep. 20, 2024.
WIPO, International Search Report and Written Opinion for PCT/CN2019/105463, Nov. 27, 2019.
USPTO, Non-Final Rejection for U.S. Appl. No. 17/324,066, filed Feb. 16, 2023.
USPTO, Notice of Allowance for U.S. Appl. No. 17/324,066, filed Jun. 22, 2023.
Fisher et al., "Multi-Scale Context Aggregation By Dilated Convolutions," International Conference on Learning Representations (ICLR2016), 2016.

(56) References Cited

OTHER PUBLICATIONS

CNIPA, First Office Action for CN Application No. 201980072289.9, Oct. 26, 2023.
CNIPA, Notification to Grant Patent Right for Invention for CN Application No. 201980072289.9, Feb. 9, 2024.
CNIPA, Notification to Grant Patent Right for Invention for CN Application No. 202080087373.0, Mar. 14, 2025.

* cited by examiner

| a first image is processed through a U-net to obtain a second image, and the second image is a noise map of the first image, wherein the U-net includes an encoding network, a decoding network and a bottleneck network between the encoding network and the decoding network, the bottleneck network including a global pooling layer, a bilinear upscaling layer and a 1x1 convolutional layer | 101 |

| a third image is generated according to the first image and the second image, and the third image is a denoised map of the first image | 102 |

FIG. 1

IMAGE DENOISING METHOD, DEVICE, AND COMPUTER-READABLE MEDIUM USING U-NET

CROSS REFERENCE OF RELATED APPLICATIONS

This application is a continuation of International Application No. PCT/CN2020/127126, filed Nov. 6, 2020, which claims priority to U.S. Provisional Patent Application No. 62/959,791, filed Jan. 10, 2020, the entire disclosures of which are incorporated herein by reference.

TECHNICAL FIELD

The disclosure relates to the technical field of image processing, and more particularly to an image processing method, an electronic device, and a computer-readable storage medium.

BACKGROUND

After an image is taken in a low-light condition with a short exposure, it is visually unfriendly since it is dark, and the color and details are invisible to the customers. It is necessary to perform denoising and image enhancement on low-light images (i.e., image taken with short exposure time under low illumination conditions). The existing denoising and image enhancement approaches provide poor image processing effects and require a large amount of processing resources.

SUMMARY

Embodiments of the disclosure provide an image processing method, an electronic device, and a computer-readable storage medium.

According to a first aspect, the disclosure provides an image processing method, which may include the following operations. A first image is processed through a U-net to obtain a second image. The second image is a noise map of the first image, and the U-net includes an encoding network, a decoding network and a bottleneck network between the encoding network and the decoding network, the bottleneck network including a global pooling layer, a bilinear upscaling layer and a 1×1 convolutional layer. A third image is generated according to the first image and the second image, and the third image is a denoised map of the first image.

According to a second aspect, the disclosure provides an electronic device, which may include a memory and a processor. The memory stores a computer program. The processor is adapted to call and execute the computer program in the memory to execute the image processing method according to the first aspect.

According to a third aspect, the disclosure provides a non-transitory computer-readable storage medium storing one or more computer programs. The computer programs may cause a processor to implement the image processing method according to the first aspect.

BRIEF DESCRIPTION OF DRAWINGS

The accompanying drawings described herein which are incorporated into and form a part of the disclosure are provided for the better understanding of the disclosure, and exemplary embodiments of the disclosure and description thereof serve to illustrate the disclosure but are not to be construed as improper limitations to the disclosure. In the accompanying drawings:

FIG. 1 is a schematic flowchart of an image processing method according to an embodiment of the disclosure.

DETAILED DESCRIPTION OF EMBODIMENTS

Figure 2:
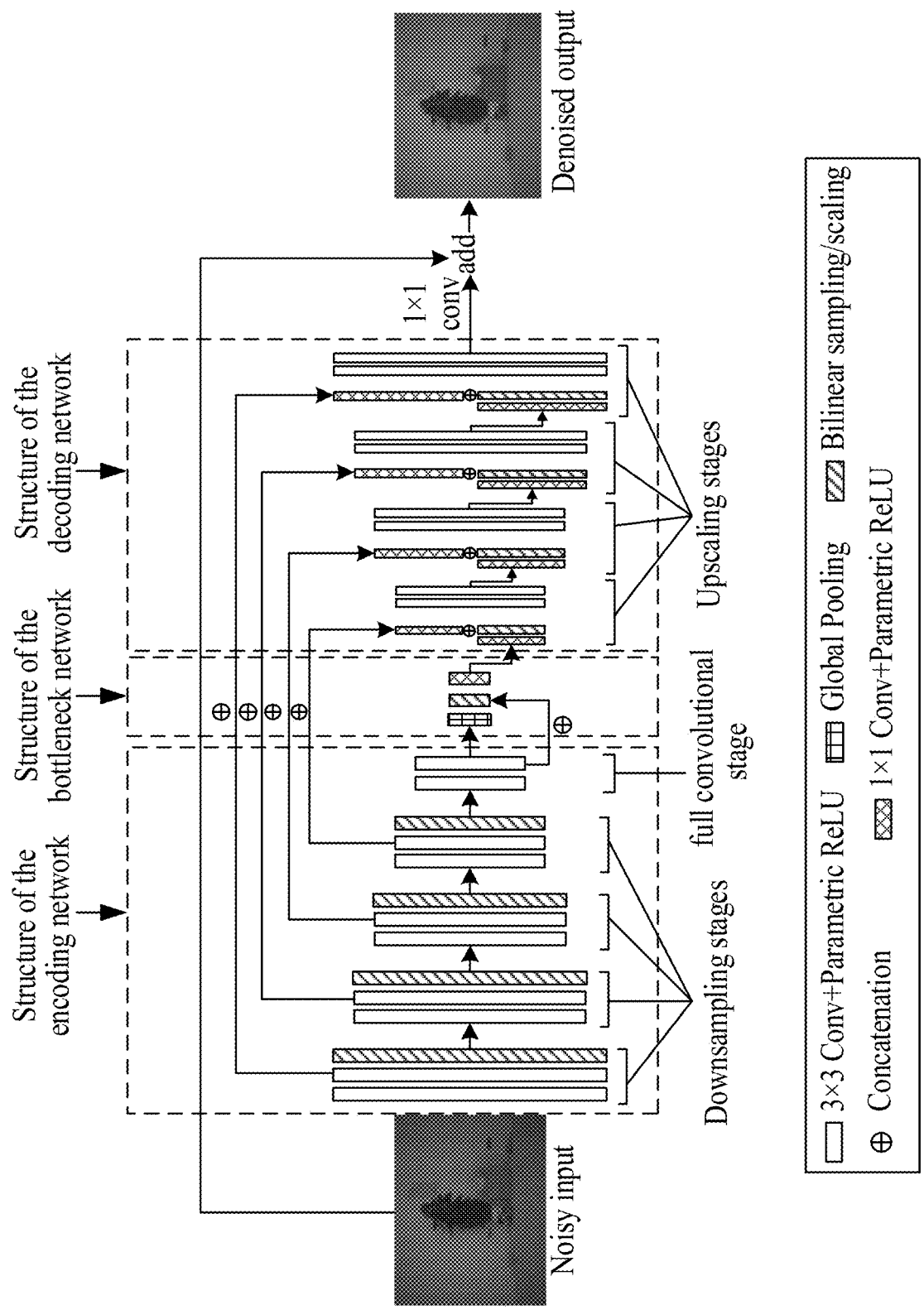
FIG. 2 is a network architecture diagram of a U-net according to an embodiment of the disclosure.

Various exemplary embodiments of the disclosure will be described in detail with reference to the drawings. It should be noted that the relative arrangement of the components and operations, numerical expressions and numerical values set forth in the embodiments are not intended to limit the scope of the disclosure.

The following description of the at least one exemplary embodiment is merely illustrative and is not intended to limit the disclosure, its application or uses.

Techniques, methods, and apparatus known to those of ordinary skill in the relevant art may not be discussed in detail, but the techniques, methods and apparatus should be considered as part of the description, where appropriate.

It should be noted that similar reference numerals and letters indicate similar elements in the drawings, and once an element is defined in one figure, it is not required to be further discussed in the subsequent figures.

Embodiments of the disclosure can be applied to computer systems/servers that can operate with other general or dedicated computing system environments or configurations. Computing systems, environments and/or configurations suitable for use with computer systems/servers may include, but are not limited to, personal computer systems, server computer systems, thin clients, thick clients, handheld or laptop devices, microprocessor-based systems, set-top boxes, programmable consumer electronics, networked personal computers, small computer systems, mainframe computer systems, distributed cloud computing technology environments including any of the above, and the like.

Taking photos with good perceptual quality under low illumination conditions is extremely challenging due to the low signal-to-noise ratio (SNR). Extending the exposure time can acquire visually good images. However, it can easily introduce motion blur, and it is not always applicable in real life. To make the low-light images with short exposure time visually plausible, extensive study has been conducted including denoising techniques which aim at removing the noises included in the image due to the low illumination condition, and enhancement techniques which are developed for improving the perceptual quality of digital images. However, the related denoising methods are generally proposed and evaluated on synthetic data, which are not generalized well to real images and the low-light enhancement approaches do not take the noise into consideration explicitly. Moreover, global context/color information is not considered in the existing methods. Although convolutional neural networks (CNNs) have advanced many computer vision applications, CNN networks are generally too large to implement on resource limited devices, such as mobile phones. Therefore, the embodiments of the disclosure develop a framework to perform denoising and enhancement for low-light images with global context/color information integrated for raw images, which can be implemented on mobile devices.

In order to facilitate the understanding of the technical solutions of the disclosure, technologies related to the embodiments of the disclosure are described below.

Related Terms (1) Image denoising: to remove noises caused by low level light exposure and preserve the details in images at the same time.

(2) Image Enhancement: a process of improving the quality of a digitally stored image by manipulating the image with algorithms.

RELATED TECHNOLOGIES (1) Image Denoising

The tradition practice for image denoising is often based on specific assumptions such as image smoothness, sparsity, low rank, or self-similarity. Most recently, deep CNNs based methods are developed for image denoising. However, those methods are generally developed and evaluated mainly on synthetic data and do not generalize well to real images.

In addition, a set of approaches is using a burst of images taken at the same time to perform denoising. Although it generally yields good performance, they are elaboratively and computationally expensive.

(2) Low-Light Image Enhancement:

A number of techniques have been developed for image enhancement, such as histogram equalization, and gamma correction. Recently, more advanced approaches have been proposed to deal with the enhancement of low-light images. However, these models share a strong assumption where the input image has clean representation without any noise. Thus, a separate denoising operation should be employed beforehand for low-light image enhancement.

One particular method is the "learning to see in the dark" model (SID, abbreviation for see in the dark) where an encoder-decoder CNN is employed to perform denoising, as well as image enhancement at the same time. However, since the global information is not considered in SID, color inconsistency can be spotted in the output images.

Most of the existing approaches perform image denoising and enhancement separately, which is time and computationally costly. Moreover, although SID performed image denoising and enhancement jointly and achieved promising results, it failed to consider the global information which is crucial for color consistency in the output images. The embodiments of the disclosure perform low-light image denoising and enhancement in a single shot with the integration of the global context. This makes the network to be aware of the global context/color information to better generate the final output. Moreover, the embodiments of the disclosure develop a new network architecture to make it available for computing resource limited mobile devices.

FIG. 1 is a schematic flowchart of an image processing method according to an embodiment of the disclosure. As illustrated in FIG. 1, the convolution method may include the following operations.

In 101, a first image is processed through a U-net to obtain a second image, and the second image is a noise map of the first image, wherein the U-net includes an encoding network, a decoding network and a bottleneck network between the encoding network and the decoding network, the bottleneck network including a global pooling layer, a bilinear upscaling layer and a 1×1 convolutional layer.

In the embodiment of the disclosure, the U-net may be called encoder-decoder network. As illustrated in FIG. 2, the U-net includes an encoding network, a decoding network and a bottleneck network between the encoding network and the decoding network. The bottleneck network includes the global pooling layer, the bilinear upscaling layer and the 1×1 convolutional layer.

In the embodiment of the disclosure, the first image is a raw image to be processed. The first image may be an image captured by a mobile phone, or may be an image obtained in other manners, such as being copied from an external storage device. There are no limits made to the source of the first image in the disclosure.

In an implementation, the first image is a low-light image. The low-light image refers to an image taken in a low-light condition with a short exposure. The solution of the embodiment of the disclosure performs image denoising and enhancement through the encoder-decoder network, to improve the perceptual quality of an image taken under extremely low-light condition.

In the embodiment of the disclosure, the first image is processed through the U-net according to the formula to obtain the second image:

$$\Delta I = f(I; w) \quad (1)$$

where ΔI represents the second image, I represents the first image, w represents a set of learnable parameters of the U-net and f represents a mapping function.

In a specific implementation, given an input image (i.e., the first image) I, a U-net is employed to learn a mapping ΔI=f (I: w), to estimate the noise map (i.e., the second image) of the input image.

In 102, a third image is generated according to the first image and the second image, and the third image is a denoised map of the first image.

In a specific implementation, the final denoised output (i.e., the third image) is obtained by take the elementwise summarization between the input image (i.e., the first image) and the predicted noise map (i.e., the second image), i.e., Î=I+ΔI.

The pipeline of the U-net provided in the disclosure is depicted in FIG. 2. The main components and methods are described in the following subsections.

In an implementation of the disclosure, before the first image is processed through the U-net, the first image is preprocessed as follows. Bayer arrays of the first image are packed into multiple channels to obtain a packed first image. A black level is subtracted from the packed first image and the resulting first image is multiplied with an amplification factor.

Figure 3:
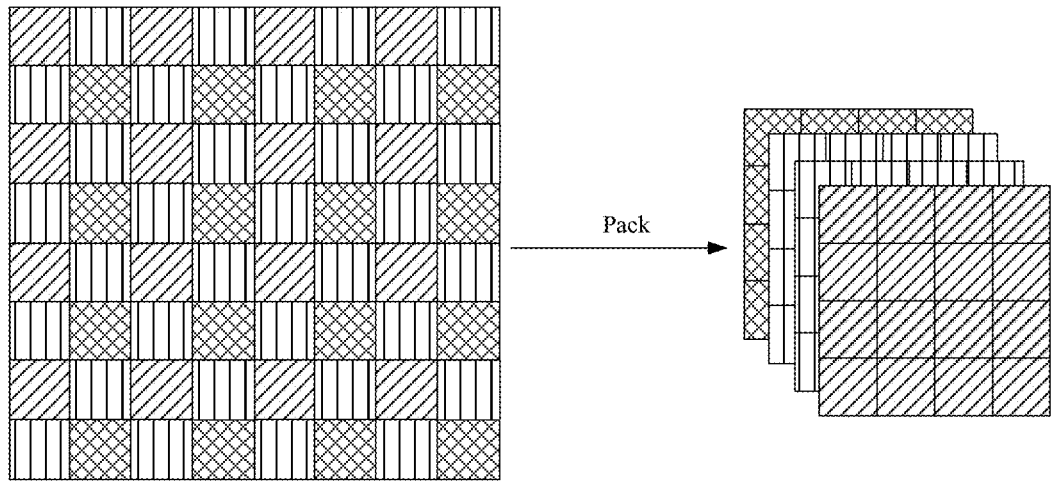
FIG. 3 is a schematic diagram of a process for packing a Bayer array into four channels according to an embodiment of the disclosure.

The multiple channels may be for example four channels. In a specific implementation, as illustrated in FIG. 3, the input raw images (i.e., the first images) are Bayer arrays, which are packed into four channels which are corresponding to R, G1, G2, and B channels, respectively. Then the packed images subtract the black level and multiply with an amplification factor to match the brightness of the corresponding ground-truth images.

As mentioned above, a U-net is trained in an end-to-end fashion to generate a noise map of the input image taken under a low-light condition. The input image has low contrast, low dynamic range, and is extremely noisy. The architecture of the U-net and the training strategies are described as follows.

(1) Network Architecture of the U-Net

In the embodiment of the disclosure, the U-net includes an encoding network (which also may be called as an encoder), a bottleneck network, and a decoding network (which also may be called as a decoder). Each network structure in the U-net is described below.

A) Structure of the Encoding Network

As illustrated in FIG. 2, the encoding network includes multiple downsampling stages. For any of the multiple downsampling stages, the downsampling stage includes a first 3×3 convolutional layer, a second 3×3 convolutional layer, and a bilinear downsampling layer. An output of the first 3×3 convolutional layer is connected to an input of the second 3×3 convolutional layer, and an output of the second 3×3 convolutional layer is connected to an input of the bilinear downsampling layer.

In an implementation, a downsampling multiple of a first downsampling stage in the multiple downsampling stages is 2.6, and downsampling multiples of the other downsampling stages except the first downsampling stage are 2.7.

In an implementation, as illustrated in FIG. 2, the encoding network further includes a full convolutional stage. The full convolutional stage is located after the multiple downsampling stages and includes a fifth 3×3 convolutional layer and a sixth 3×3 convolutional layer. An output of a last downsampling stage in the multiple downsampling stages is connected to an input of the fifth 3×3 convolutional layer, an output of the fifth 3×3 convolutional layer is connected to an input of the sixth 3×3 convolutional layer, and an output of the sixth 3×3 convolutional layer is connected to a global pooling layer of the bottleneck network.

B) Structure of the Bottleneck Network

As illustrated in FIG. 2, the bottleneck network includes a global pooling layer, a bilinear upscaling layer and a 1×1 convolutional layer.

In the bottleneck network, an output of the global pooling layer is connected to an input of the bilinear upscaling layer, and an output of the bilinear upscaling layer and the output of the sixth 3×3 convolutional layer in the full convolutional stage in A) are concatenated as an input of the 1×1 convolutional layer.

C) Structure of the Decoding Network

As illustrated in FIG. 2, the decoding network includes multiple upscaling stages. The multiple upscaling stages in the decoding network correspond to respective downsampling stages in the encoding network according to resolutions.

For any of the multiple upscaling stages, the upscaling stage includes a first 1×1 convolutional layer, a bilinear upsampling layer, a second 1×1 convolutional layer, a third 3×3 convolutional layer, and a fourth 3×3 convolutional layer. An output of the first 1×1 convolutional layer is connected to an input of the bilinear upsampling layer, an output of a downsampling stage corresponding to the upscaling stages is connected to an input of the second 1×1 convolutional layer, an output of the bilinear upsampling layer and an output of the second 1×1 convolutional layer are concatenated as an input of the third 3×3 convolutional layer, and an output of the third 3×3 convolutional layer is connected to an input of the fourth 3×3 convolutional layer.

As illustrated in FIG. 2, the U-net consists of a stack of processing layers. The input image firstly goes through an encoder including a set of downsampling stages to extract abstract features, as well as to reduce the spatial resolution. After the bottleneck network (called as bottleneck for short), the feature map may go through a decoder including a set of upscaling operations.

(2) Computational Cost Reduction

Traditional convolutional neural networks use pooling layers to downsample the feature map to reduce computational cost. Specifically, max or mean value is picked from a sliding window with a stride on the input feature map (H×W) to produce an output feature map with a spatial size of H/stride*W/stride. While a common choice for the stride size is 2 or 3, it lacks flexibility to downsample the feature map with arbitrary downsampling rate. For example, in experiments of the disclosure, it is noticed that using a stride size of 2 produces good performance yet requires high computational cost, while using a stride size of 3 reduces computational cost dramatically, but the final performance degrades a lot. To cope with the above mentioned problem, the embodiments of the disclosure use bilinear interpolation for downsampling in the network to further reduce the computational cost of the network while maintaining the final performance. In particular, instead of downsampling the feature map 2× in both width and height each time using a pooling layer with a stride of 2 as in traditional U-Nets, the embodiments of the disclosure downsample the feature map 2.6× after the first convolutional stage, and 2.7× after the other convolutional stages in the encoder of the proposed U-Net. It should be noted that the convolutional stage indicates a convolutional layer in the downsampling stage.

As illustrated in FIG. 2, to reduce both the memory and time cost, in the upscaling stage, the input layer is firstly processed using a 1×1 convolutional layer to shrink the number of channels and then upscaled using bilinear interpolation. The layer of the same resolution from the downsampling stage is also processed using a 1×1 convolutional layer for channel shrinking purpose. Then the two output feature maps are concatenated as the input to the following layers.

(3) Local and Global Context Information

Since the input image can be of any resolution, the size of the feature maps in the bottleneck of the network can still be large, where the global context/color information cannot be observed. As a result, the generated image may have inconsistent colors at different locations. To cope with the problem, the embodiments of the disclosure develop a strategy to introduce global context/color information into the network. As illustrated in FIG. 2, a global pooling layer, represented by the red block, is introduced to extract the global context information. After the pooling layer, an upscaling operation is employed to rescale the feature map back to the same size of the input feature map to perform the following concatenation process, as well as the convolutional operations. However, since the input of our framework has arbitrary size, which means that the feature map in the bottleneck has arbitrary size, the size of the kernel in the deconvolutional layer will be dynamic which is impeccable. Thus, instead of using a deconvolutional layer, a bilinear upscaling operation is employed (represented by the black block). The extracted feature maps are concatenated channel-wisely followed by a 1×1 convolutional layer to generate the final representation containing global information of the input image.

(4) Cost Function

During the training process, the low-light images (i.e., first images) are fed into the network (i.e., the U-net) as input, and a loss function is calculated between the system output and the corresponding long-exposure raw images.

The loss function employed is a weighted joint loss of $\ell_2$ distance on pixel values and $\ell_i$ distance on pixel gradients, which is defined as follows:

$$\mathcal{L} = \lambda_1 \mathcal{L}^{\ell_1} + \lambda_2 \mathcal{L}^{\ell_2} \quad (2)$$

where $\lambda_1$ and $\lambda_2$ are both set to 1 empirically, $\mathcal{L}^{\ell_1}$ and $\ell_1$ is the loss defined by the following equation:

$$\mathcal{L}^{\ell_1} = \|\nabla\Gamma(I(i)) - \nabla\Gamma(\hat{I}(i))\|_1 \quad (3)$$

where $\hat{I}$ and $I$ are the output demosaicked image and the ground-truth demosaicked image, respectively, and $\nabla$ is the finite difference operator that convolves its input with $[-1,1]$ and $[-1,1]^T$. F is the sRGB transfer function:

$$\Gamma = \begin{cases} 12.92X, & X \leq 0.0031308 \\ (1+a)X^{\frac{1}{2.4}}, & X > 0.0031308 \end{cases} \quad (3.1)$$

$$a = 0.0055 \quad (3.2)$$

And the $\ell_2$ loss is defined by the following equation:

$$\mathcal{L}^{\ell_2} = \|\Gamma(I(i)) - \Gamma(\hat{I}(i))\|_2^2 \quad (4)$$

Figure 4A:
FIGS. 4A-4D are schematic diagrams of testing results according to an embodiment of the disclosure.
Figure 4B:
Figure 4C:
Figure 4D:
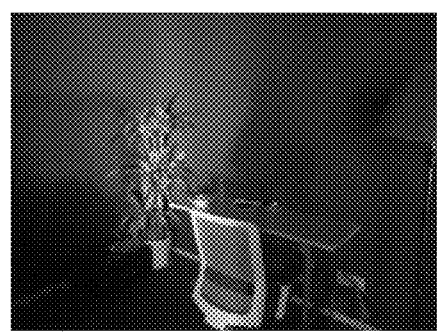

During the inference process, given an input raw image, the output raw image will be obtained by summarizing the output of the well-trained network and the input raw image. Some qualitative results are given in FIGS. 4A-4D. As illustrated in FIGS. 4A-4D, FIGS. 4A and 4C give the input low-light raw images in sRGB color space, and FIGS. 4B and 4D give the system outputs of the U-net according to the embodiment of the disclosure in sRGB color space.

Table 1 gives the results using the model with max-pooling with a stride of 2 and the proposed model using bilinear downsampling of 2.6×, 2.7×, 2.7×, 2.7× after the four convolutional stages in the encoder, respectively. The FLOPs (FLoating point Operations Per Second) of the proposed model is about ⅕ of that of the model using max-pooling, while the performance measured by PSNR on Sony dataset is quite similar, demonstrating the effectiveness of using bilinear downsampling to reduce the computational cost while maintaining the accuracy of the network.

Model FLOPs PSNR on Sony dataset
Model with max-pooling (stride=2) 206.8B 39.61
Model with bilinear downsampling (2.6×, 2.7×, 2.7×, 2.7×) 47.7B 39.57

Table 1. Comparison between the model using max-pooling with a stride of 2 and the proposed model using bilinear downsampling of 2.6×, 2.7×, 2.7×, 2.7× after the four convolutional stages in the encoder, respectively.

The benefits of the disclosure include at least the following: (1) largely reducing the cost of developing advanced hardware for capturing better images; (2) largely saving the cost of introducing engines to keep the phones steady under low-light condition; (3) fully exploring the resolutions without applying ultrapixel technique; (4) being capable of saving space originally required by the large sensors for better engineering design.

Figure 5:
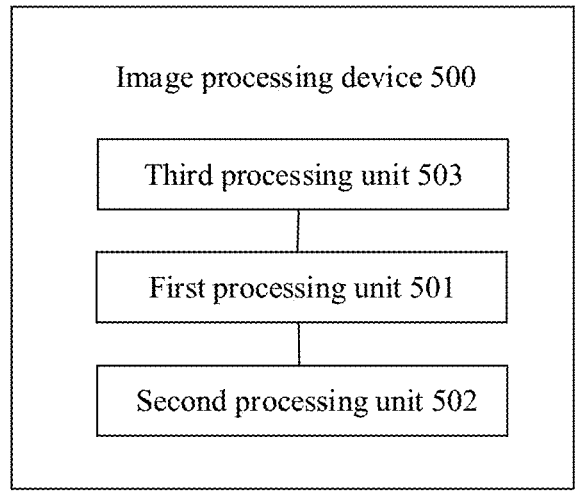
FIG. 5 is a schematic diagram of an image processing device according to an embodiment of the disclosure.

The embodiments of the disclosure also provide an image processing device 500. As illustrated in FIG. 5, the image processing device 500 may include a first processing unit 501 and a second processing unit 502.

The first processing unit 501 is adapted to process a first image through a U-net to obtain a second image. The second image is a noise map of the first image. The U-net includes an encoding network, a decoding network and a bottleneck network between the encoding network and the decoding network. The bottleneck network includes a global pooling layer, a bilinear upscaling layer and a 1×1 convolutional layer.

The second processing unit 502 is adapted to generate a third image according to the first image and the second image. The third image is a denoised map of the first image.

In at least one implementation of the disclosure, the device may further a third processing unit 503. The third processing unit 503 is adapted to perform the following preprocessing on the first image: packing Bayer arrays of the first image into multiple channels to obtain a packed first image, subtracting a black level from the packed first image and multiplying the resulting first image with an amplification factor.

In at least one implementation of the disclosure, the encoding network may include multiple downsampling stages. At least one of the multiple downsampling stages may include a first 3×3 convolutional layer, a second 3×3 convolutional layer, and a bilinear downsampling layer. An output of the first 3×3 convolutional layer is connected to an input of the second 3×3 convolutional layer, and an output of the second 3×3 convolutional layer is connected to an input of the bilinear downsampling layer.

In at least one implementation of the disclosure, a downsampling multiple of a first downsampling stage in the multiple downsampling stages may be 2.6, and downsampling multiples of the other downsampling stages except the first downsampling stage may be 2.7.

In at least one implementation of the disclosure, the decoding network may include multiple upscaling stages, and the multiple upscaling stages in the decoding network may correspond to respective downsampling stages in the encoding network according to resolutions.

For each of the multiple upscaling stages, the upscaling stage may include a first 1×1 convolutional layer, a bilinear upsampling layer, a second 1×1 convolutional layer, a third 3×3 convolutional layer, and a fourth 3×3 convolutional layer.

An output of the first 1×1 convolutional layer is connected to an input of the bilinear upsampling layer. An output of a downsampling stage corresponding to the upscaling stages is connected to an input of the second 1×1 convolutional layer. An output of the bilinear upsampling layer and an output of the second 1×1 convolutional layer are concatenated as an input of the third 3×3 convolutional layer, and an output of the third 3×3 convolutional layer is connected to an input of the fourth 3×3 convolutional layer.

In at least one implementation of the disclosure, the encoding network may further include a full convolutional stage. The full convolutional stage is located after the multiple downsampling stages and includes a fifth 3×3 convolutional layer and a sixth 3×3 convolutional layer.

An output of a last downsampling stage in the multiple downsampling stages is connected to an input of the fifth 3×3 convolutional layer. An output of the fifth 3×3 convolutional layer is connected to an input of the sixth 3×3 convolutional layer, and an output of the sixth 3×3 convolutional layer is connected to the global pooling layer of the bottleneck network.

In at least one implementation of the disclosure, in the bottleneck network, the global pooling layer may be connected to an input of the bilinear upscaling layer, and an output of the bilinear upscaling layer and the output of the sixth 3×3 convolutional layer in the full convolutional stage may be concatenated as an input of the 1×1 convolutional layer.

It is to be understood that in the embodiments of the disclosure, the description on the image processing device may be understood with reference to the above related description on the image processing method.

Figure 6:
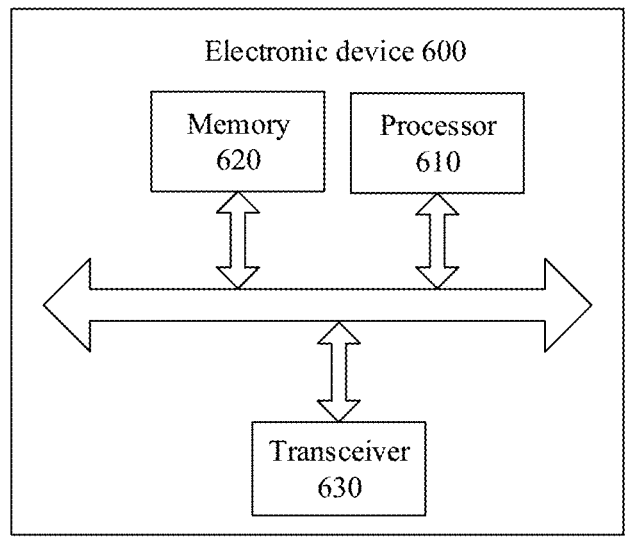
FIG. 6 is a schematic diagram of an electronic device according to an embodiment of the disclosure.

FIG. 6 is a schematic structure diagram of an electronic device 600 according to an embodiment of the disclosure. The electronic device may be a terminal, such as a mobile phone, a tablet computer, or the like. The electronic device 600 illustrated in FIG. 6 includes a processor 610. The processor 610 may call and execute the computer programs in a memory to implement the method in the embodiments of the disclosure.

In at least one embodiment, as illustrated in FIG. 6, the electronic device 600 may further include a memory 620. The processor 610 may call and execute the computer programs in the memory 620 to implement the method in the embodiments of the disclosure.

The memory 620 may be a separate device from the processor 610, and may also be integrated into the processor 610.

In at least one embodiment, as illustrated in FIG. 6, the electronic device 600 may further include a transceiver 630. The processor 610 may control the transceiver 630 to communicate with another device. Specifically, the processor 610 may control the transceiver 630 to send information or data to another device, or receive information or data from another device.

The transceiver 630 may include a transmitter and a receiver. The transceiver 630 may further include one or more antennas.

In at least one embodiment, the electronic device 600 may specifically be a network device in the embodiments of the disclosure. The electronic device 600 may implement a corresponding process implemented by the network device in each method embodiment of the disclosure, which will not be elaborated herein for brief description.

In at least one embodiment, the electronic device 600 may specifically be a terminal/mobile terminal in the embodiments of the disclosure. The electronic device 600 may implement a corresponding process implemented by the terminal/mobile terminal in each method embodiment of the disclosure, which will not be elaborated herein for brief description.

Figure 7:
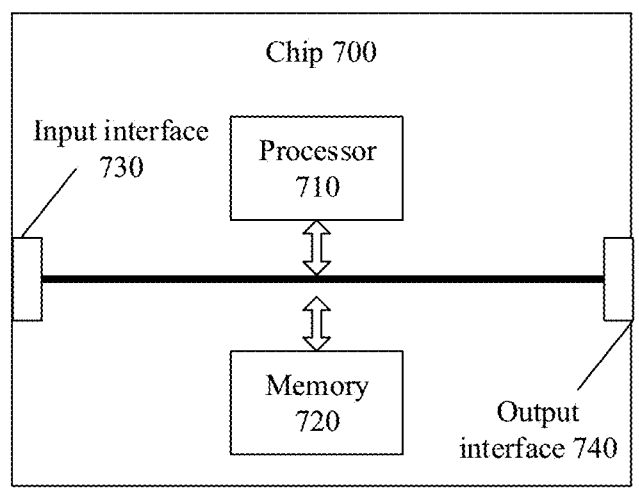
FIG. 7 is a schematic structure diagram of a chip according to an embodiment of the disclosure.

FIG. 7 is a schematic structure diagram of a chip according to an embodiment of the disclosure. As illustrated in FIG. 7, the chip 700 includes a processor 710. The processor 710 may call and execute the computer programs in a memory to implement the method in the embodiments of the disclosure.

In at least one embodiment, as illustrated in FIG. 7, the chip 700 may further include a memory 720. The processor 710 may call and execute the computer programs in the memory 720 to implement the method in the embodiments of the disclosure.

The memory 720 may be a separate device from the processor 710, and may also be integrated into the processor 710.

In at least one embodiment, the chip 700 may further include an input interface 730. The processor 710 may control the input interface 730 to communicate with another device or chip. Specifically, the processor 710 may control the input interface 730 to obtain information or data from another device or chip.

In at least one embodiment, the chip 700 may further include an output interface 740. The processor 710 may control the output interface 740 to communicate with another device or chip. Specifically, the processor 710 may control the output interface 740 to send information or data to another device or chip.

In at least one embodiment, the chip may be applied to the network device in the embodiments of the disclosure. The chip may implement a corresponding process implemented by the network device in each method embodiment of the disclosure, which will not be elaborated herein for brief description.

In at least one embodiment, the chip may be applied to the terminal/mobile terminal in the embodiments of the disclosure. The chip may implement a corresponding process implemented by the terminal/mobile terminal in each method embodiment of the disclosure, which will not be elaborated herein for brief description.

It is to be understood that in the embodiments of the disclosure, the chip may also be referred to as a system level chip, a system chip, a chip system or a system-on-chip.

It is to be understood that in the embodiments of the disclosure, the processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any related processor and the like. The operations of the methods disclosed in combination with the embodiments of the disclosure may be directly embodied to be executed and completed by a hardware decoding processor, or executed and completed by a combination of hardware and software modules in the decoding processor. The software module may be located in a mature storage medium in the art, such as a Random Access Memory (RAM), a flash memory, a Read-Only Memory (ROM), a Programmable ROM (PROM), an Electrically Erasable PROM (EEPROM) or a register. The storage medium is located in the memory. The processor reads information in the memory, and completes the operations of the above methods in combination with hardware of the processor.

It may be understood that the memory in the embodiment of the disclosure may be a volatile memory or a non-volatile memory, or may include the volatile memory and the non-volatile memory. The non-volatile memory may be an ROM, a PROM, an Erasable PROM (EPROM), an EEPROM or a flash memory. The volatile memory may be an RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of the system and the method described in the disclosure is intended to include but not limited to memories of these and any other suitable type.

The embodiments of the disclosure also provide a computer-readable storage medium for storing one or more computer programs.

In at least one embodiment, the computer-readable storage medium may be applied in the network device of the embodiments of the disclosure. The computer programs may enable a processor to perform the corresponding process implemented by the network device in each method embodiment of the disclosure, which will not be elaborated herein for brief description.

In at least one example, the computer-readable storage medium may be applied in the terminal/mobile terminal of the embodiments of the disclosure. The computer programs may enable a processor to perform the corresponding process implemented by the terminal/mobile terminal in each method embodiment of the disclosure, which will not be elaborated herein for brief description.

The embodiments of the disclosure also provide a computer program product. The computer program product includes one or more computer program instructions.

In at least one embodiment, the computer program product may be applied in the network device of the embodiments of the disclosure. The computer program instructions may enable a processor to perform the corresponding process implemented by the network device in each method embodiment of the disclosure, which will not be elaborated herein for brief description.

In at least one example, the computer program product may be applied in the terminal/mobile terminal of the embodiments of the disclosure. The computer program instructions may enable a processor to perform the corresponding process implemented by the terminal/mobile terminal in each method embodiment of the disclosure, which will not be elaborated herein for brief description.

The embodiments of the disclosure also provide a computer program.

In at least one embodiment, the computer program may be applied in the network device of the embodiments of the disclosure. The computer program, when executed by a processor, enables a processor to perform the corresponding process implemented by the network device in each method embodiment of the disclosure, which will not be elaborated herein for brief description.

In at least one example, the computer program may be applied in the terminal/mobile terminal of the embodiments of the disclosure. The computer program, when executed by a processor, enables a processor to perform the corresponding process implemented by the terminal/mobile terminal in each method embodiment of the disclosure, which will not be elaborated herein for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. An image processing method, comprising:
processing a first image through a U-net to obtain a second image, the second image being a noise map of the first image, wherein the U-net comprises an encoding network, a decoding network, and a bottleneck network between the encoding network and the decoding network, the bottleneck network comprising a global pooling layer, a bilinear upscaling layer and a 1×1 convolutional layer; and
generating a third image according to the first image and the second image, the third image being a denoised map of the first image.

2. The method according to claim 1, wherein before processing the first image through the U-net, the method further comprises:
packing Bayer arrays of the first image into multiple channels to obtain a packed first image; and
subtracting a black level from the packed first image and multiplying the resulting first image with an amplification factor.

3. The method according to claim 1, wherein the encoding network comprises multiple downsampling stages, and at least one of the multiple downsampling stages comprises a first 3×3 convolutional layer, a second 3×3 convolutional layer, and a bilinear downsampling layer; wherein
an output of the first 3×3 convolutional layer is connected to an input of the second 3×3 convolutional layer, and an output of the second 3×3 convolutional layer is connected to an input of the bilinear downsampling layer.

4. The method according to claim 2, wherein the encoding network comprises multiple downsampling stages, and at least one of the multiple downsampling stages comprises a first 3×3 convolutional layer, a second 3×3 convolutional layer, and a bilinear downsampling layer; wherein
an output of the first 3×3 convolutional layer is connected to an input of the second 3×3 convolutional layer, and an output of the second 3×3 convolutional layer is connected to an input of the bilinear downsampling layer.

5. The method according to claim 3, wherein a downsampling multiple of a first downsampling stage in the multiple downsampling stages is 2.6, and downsampling multiples of the other downsampling stages except the first downsampling stage are 2.7.

6. The method according to claim 3, wherein the decoding network comprises multiple upscaling stages, and the multiple upscaling stages in the decoding network correspond to the respective downsampling stages in the encoding network according to resolutions;
for each of the multiple upscaling stages, the upscaling stage comprises a first 1×1 convolutional layer, a bilinear upsampling layer, a second 1×1 convolutional layer, a third 3×3 convolutional layer, and a fourth 3×3 convolutional layer, wherein
an output of the first 1×1 convolutional layer is connected to an input of the bilinear upsampling layer, an output of a downsampling stage corresponding to the upscaling stage is connected to an input of the second 1×1 convolutional layer, an output of the bilinear upsampling layer and an output of the second 1×1 convolutional layer are concatenated as an input of the third 3×3 convolutional layer, and an output of the third 3×3 convolutional layer is connected to an input of the fourth 3×3 convolutional layer.

7. The method according to claim 4, wherein the decoding network comprises multiple upscaling stages, and the multiple upscaling stages in the decoding network correspond to the respective downsampling stages in the encoding network according to resolutions;
for each of the multiple upscaling stages, the upscaling stage comprises a first 1×1 convolutional layer, a bilinear upsampling layer, a second 1×1 convolutional layer, a third 3×3 convolutional layer, and a fourth 3×3 convolutional layer, wherein
an output of the first 1×1 convolutional layer is connected to an input of the bilinear upsampling layer, an output of a downsampling stage corresponding to the upscaling stage is connected to an input of the second 1×1 convolutional layer, an output of the bilinear upsampling layer and an output of the second 1×1 convolutional layer are concatenated as an input of the third 3×3 convolutional layer, and an output of the third 3×3 convolutional layer is connected to an input of the fourth 3×3 convolutional layer.

8. The method according to claim 5, wherein the decoding network comprises multiple upscaling stages, and the multiple upscaling stages in the decoding network correspond to respective downsampling stages in the encoding network according to resolutions;
for each of the multiple upscaling stages, the upscaling stage comprises a first 1×1 convolutional layer, a bilinear upsampling layer, a second 1×1 convolutional layer, a third 3×3 convolutional layer, and a fourth 3×3 convolutional layer, wherein
an output of the first 1×1 convolutional layer is connected to an input of the bilinear upsampling layer, an output of a downsampling stage corresponding to the upscaling stage is connected to an input of the second 1×1 convolutional layer, an output of the bilinear upsampling layer and an output of the second 1×1 convolutional layer are concatenated as an input of the third 3×3 convolutional layer, and an output of the third 3×3 convolutional layer is connected to an input of the fourth 3×3 convolutional layer.

9. The method according to claim 6, wherein the encoding network further comprises a full convolutional stage, the full convolutional stage is located after the multiple downsampling stages and comprises a fifth 3×3 convolutional layer and a sixth 3×3 convolutional layer, wherein
an output of a last downsampling stage in the multiple downsampling stages is connected to an input of the fifth 3×3 convolutional layer, an output of the fifth 3×3 convolutional layer is connected to an input of the sixth 3×3 convolutional layer, and an output of the sixth 3×3 convolutional layer is connected to the global pooling layer of the bottleneck network.

10. The method according to claim 9, wherein in the bottleneck network, an output of the global pooling layer is connected to an input of the bilinear upscaling layer, and an output of the bilinear upscaling layer and the output of the sixth 3×3 convolutional layer are concatenated as an input of the 1×1 convolutional layer of the bottleneck network.

11. An electronic device, comprising:
a memory storing a computer program; and
a processor, configured to call and execute the computer program stored in the memory to implement an image processing method comprising:
processing a first image through a U-net to obtain a second image, the second image being a noise map of the first image, wherein the U-net comprises an encoding network, a decoding network and a bottleneck network between the encoding network and the decoding network, the bottleneck network comprising a global pooling layer, a bilinear upscaling layer and a convolutional layer; and
generating a third image according to the first image and the second image, the third image being a denoised map of the first image.

12. The electronic device according to claim 11, wherein before the operation of processing a first image through a U-net, comprises:
packing Bayer arrays of the first image into multiple channels to obtain a packed first image; and
subtracting a black level from the packed first image and multiplying the resulting first image with an amplification factor.

13. The electronic device according to claim 11, wherein the encoding network comprises multiple downsampling stages, and at least one of the multiple downsampling stages comprises a first 3×3 convolutional layer, a second 3×3 convolutional layer, and a bilinear downsampling layer; wherein an output of the first 3×3 convolutional layer is connected to an input of the second 3×3 convolutional layer, and an output of the second 3×3 convolutional layer is connected to an input of the bilinear downsampling layer.

14. The electronic device according to claim 13, wherein a downsampling multiple of a first downsampling stage in the multiple downsampling stages is 2.6, and downsampling multiples of the other downsampling stages except the first downsampling stage are 2.7.

15. The electronic device according to claim 13, wherein the decoding network comprises multiple upscaling stages, and the multiple upscaling stages in the decoding network correspond to the respective downsampling stages in the encoding network according to resolutions;

for each of the multiple upscaling stages, the upscaling stage comprises a first 1×1 convolutional layer, a bilinear upsampling layer, a second 1×1 convolutional layer, a third 3×3 convolutional layer, and a fourth 3×3 convolutional layer, wherein an output of the first 1×1 convolutional layer is connected to an input of the bilinear upsampling layer, an output of a downsampling stage corresponding to the upscaling stages is connected to an input of the second 1×1 convolutional layer, an output of the bilinear upsampling layer and an output of the second 1×1 convolutional layer are concatenated as an input of the third 3×3 convolutional layer, and an output of the third 3×3 convolutional layer is connected to an input of the fourth 3×3 convolutional layer.

16. The electronic device according to claim 15, wherein the encoding network further comprises a full convolutional stage, the full convolutional stage is located after the multiple downsampling stages and comprises a fifth 3×3 convolutional layer and a sixth 3×3 convolutional layer, wherein an output of a last downsampling stage in the multiple downsampling stages is connected to an input of the fifth 3×3 convolutional layer, an output of the fifth 3×3 convolutional layer is connected to an input of the sixth 3×3 convolutional layer, and an output of the sixth 3×3 convolutional layer is connected to an input of the global pooling layer of the bottleneck network.

17. The electronic device according to claim 16, wherein in the bottleneck network, an output of the global pooling layer is connected to an input of the bilinear upscaling layer, and an output of the bilinear upscaling layer and the output of the sixth 3×3 convolutional layer are concatenated as an input of the convolutional layer of the bottleneck network.

18. A non-transitory computer-readable storage medium having stored thereon a computer program that, when executed by a processor, causes the processor to execute an image processing method comprising;

processing a first image through a U-net to obtain a second image, the second image being a noise map of the first image, wherein the U-net comprises an encoding network, a decoding network and a bottleneck network between the encoding network and the decoding network, the bottleneck network comprising a global pooling layer, a bilinear upscaling layer and a 1×1 convolutional layer; and generating a third image according to the first image and the second image, the first image being a noisy image, and the third image being a denoised map of the first image.

19. The non-transitory computer-readable storage medium according to claim 18, wherein before the operation of processing a first image through a U-net, the image processing method comprises:

packing Bayer arrays of the first image into multiple channels to obtain a packed first image; and subtracting a black level from the packed first image and multiplying the resulting first image with an amplification factor.

20. The non-transitory computer-readable storage medium according to claim 19, wherein the encoding network comprises multiple downsampling stages, and at least one of the multiple downsampling stages comprises a first 3×3 convolutional layer, a second 3×3 convolutional layer, and a bilinear downsampling layer; wherein an output of the first 3×3 convolutional layer is connected to an input of the second 3×3 convolutional layer, and an output of the second 3×3 convolutional layer is connected to an input of the bilinear downsampling layer;

wherein the decoding network comprises multiple upscaling stages, and the multiple upscaling stages in the decoding network correspond to the respective downsampling stages in the encoding network according to resolutions; for each of the multiple upscaling stages, the upscaling stage comprises a first 1×1 convolutional layer, a bilinear upsampling layer, a second 1×1 convolutional layer, a third 3×3 convolutional layer, and a fourth 3×3 convolutional layer; an output of the first 1×1 convolutional layer is connected to an input of the bilinear upsampling layer, an output of a downsampling stage corresponding to the upscaling stage is connected to an input of the second 1×1 convolutional layer, an output of the bilinear upsampling layer and an output of the second 1×1 convolutional layer are concatenated as an input of the third 3×3 convolutional layer, and an output of the third 3×3 convolutional layer is connected to an input of the fourth 3×3 convolutional layer;

wherein the encoding network further comprises a full convolutional stage, the full convolutional stage is located after the multiple downsampling stages and comprises a fifth 3×3 convolutional layer and a sixth 3×3 convolutional layer; an output of a last downsampling stage in the multiple downsampling stages is connected to an input of the fifth 3×3 convolutional layer, an output of the fifth 3×3 convolutional layer is connected to an input of the sixth 3×3 convolutional layer, and an output of the sixth 3×3 convolutional layer is connected to an input of the global pooling layer of the bottleneck network;

wherein in the bottleneck network, an output of the global pooling layer is connected to an input of the bilinear upscaling layer, and an output of the bilinear upscaling layer and the output of the sixth 3×3 convolutional layer are concatenated as an input of the 1×1 convolutional layer of the bottleneck network.

* * * * *